US012607732B2

(12) United States Patent
Daniels et al.

(10) Patent No.: US 12,607,732 B2
(45) Date of Patent: Apr. 21, 2026

(54) SYSTEMS AND METHODS FOR DETECTING PHYSICAL OBJECTS USING PASSIVE RADAR RECEIVERS

(71) Applicant: Cobalt Solutions, Inc., Austin, TX (US)

(72) Inventors: Robert Clark Daniels, Round Rock, TX (US); Alvin Warren Leung, Austin, TX (US); April Camille Tucker, Austin, TX (US); Mark Philip Leach, Austin, TX (US)

(73) Assignee: COBALT SOLUTIONS, INC, Austin, TX (US)

( * ) Notice: Subject to any disclaimer, the term of this patent is extended or adjusted under 35 U.S.C. 154(b) by 1098 days.

(21) Appl. No.: 17/676,205

(22) Filed: Feb. 20, 2022

(65) Prior Publication Data

US 2022/0268908 A1 Aug. 25, 2022

Related U.S. Application Data

(60) Provisional application No. 63/152,742, filed on Feb. 23, 2021.

(51) Int. Cl.
*G01S 13/00* (2006.01)
*G01S 13/06* (2006.01)

(52) U.S. Cl.
CPC ............ *G01S 13/003* (2013.01); *G01S 13/06* (2013.01)

(58) Field of Classification Search
CPC ................................ G01S 13/003; G01S 13/06
See application file for complete search history.

(56) References Cited

U.S. PATENT DOCUMENTS

| | | | | |
|---|---|---|---|---|
| 10,281,569 B2 * | 5/2019 | Muller | .................. | G01S 7/418 |
| 11,792,741 B2 * | 10/2023 | Manolakos | ......... | H04W 52/243 |
| | | | | 370/252 |
| 11,889,462 B2 * | 1/2024 | Park | ........................ | G01S 13/42 |
| 11,971,500 B2 * | 4/2024 | Duan | ....................... | G01S 7/006 |
| 2019/0265348 A1 * | 8/2019 | Bengtsson | .............. | G01S 13/10 |
| 2020/0119780 A1 * | 4/2020 | Klemmer | ................. | H01Q 3/24 |
| 2022/0109957 A1 * | 4/2022 | Duan | ..................... | G01S 5/0205 |
| 2022/0113400 A1 * | 4/2022 | Manolakos | ............. | G01S 7/006 |
| 2022/0171016 A1 * | 6/2022 | Manolakos | ......... | H04L 41/0803 |
| 2022/0236394 A1 * | 7/2022 | Nam | ........................ | G01S 13/46 |

FOREIGN PATENT DOCUMENTS

GB          2517651 A  *  3/2015  ........... G01S 13/003

* cited by examiner

*Primary Examiner* — Matthew M Barker

(57) ABSTRACT

A method of determining the location of a physical object using a passive radar receiver includes determining if a transmitter beam sweeping period (TBSP) is known, and executing a TBSP-based receiver beam sweeping if the TBSP is known. If the TBSP is not known, determining if the TBSP can be measured, and executing the TBSP-based beam sweeping if the TBSP can be measured. The method includes executing a random receiver beam sweeping if the TBSP is not known and cannot be measured. The method includes determining a relative time of arrival of radio signals between the LoS path and the target path, and determining the propagation times on the LoS path and on the target path. The method includes determining the location of the physical object using the propagation times.

6 Claims, 10 Drawing Sheets

100

112

Reference Receiver    Surveillance Receiver
for LoS Path    for Target Path

128

108

124

116

LoS Path Shared

120

104

SYSTEMS AND METHODS FOR DETECTING PHYSICAL OBJECTS USING PASSIVE RADAR RECEIVERS

CROSS REFERENCE TO RELATED APPLICATION

This application claims priority to U.S. Provisional Application No. 63/152,742, filed Feb. 23, 2021, entitled "A Passive Radar Receiver For Fifth Generation Mobile Networks", which is hereby incorporated by reference in its entirety.

TECHNICAL FIELD

The present invention relates to object detection, and in particular to systems and methods for detecting and locating physical objects using passive radar receivers.

BACKGROUND

A passive radar receiver system may include a single receiver or multiple receivers that are not co-located with a transmitter. The system is considered passive because the receivers are not co-located with the transmitters. In a bi-static passive radar configuration, a single receiver may receive radio signals from a single transmitter that is not co-located with the receiver, and in a multi-static passive radar configuration, multiple receivers may receive radio signals from a transmitter that is not co-located with the receivers.

A passive radar receiver may be un-coordinated with a transmitter where the receiver may receive signals from a transmitter that is not under control of the receiver, or a passive radar receiver may be coordinated with a transmitter where the receiver may receive signals from a transmitter which is under control of the receiver. Typically, if the passive radar receiver is coordinated with the transmitter, the receiver knows the spatial direction and other information about the transmit beam which is transmitted by the transmitter but if the passive radar receiver is un-coordinated with the transmitter, the receiver may not know the spatial direction and other information about the transmit beam.

Passive radar receivers have been used to detect physical objects. FIG. 1 illustrates a current system 100 which may be used to detect a physical object. The system 100 includes first and second passive radar receivers, 104 and 108, respectively, which are used to detect a physical object 112. The physical object 112 may, for example, be a drone or an airplane. The system 100 includes a transmitter 116 which may, for example, be a radio base station. The first and second passive radar receivers 104 and 108 are generally not co-located with the transmitter 116.

The first passive radar receiver 104 is also referred to as a reference receiver 104. Radio signals transmitted by the transmitter 116 propagate on a line of sight (LoS) path 120 directly to the receiver 104.

The second passive radar receiver 108 is also referred to as a surveillance receiver 108. Radio signals transmitted by the transmitter 116 propagate on a target path which comprises two paths. The transmitted signals from the transmitter 116 first propagates on a path 124 to the physical object 112 and interacts with the physical object 112. The signals are reflected and/or scattered by the physical object and propagate on a path 128 to finally arrive at the surveillance receiver 108.

Due to differences in channel characteristics, distance associated with the LoS path 120 and the target path (which comprises the path 124 and the path 128), path loss experienced by the signals, the antenna gains of the reference receiver 104 and the surveillance receiver 108, the signals received by the reference receiver 104 may have a delay time and a signal strength that are different than a delay time and a signal strength of the signals received by the surveillance receiver 108. Based on an analysis of the delay times and the signal strengths of the signals over the LoS path 120 and the target path (which comprises the path 124 and the path 128), the physical object 112 is detected.

Existing passive radar receiver systems used to detect and track physical objects have several limitations. These systems generally need two separate receivers (e.g., a reference receiver and a surveillance receiver). Also, because the absolute time at which the radio signals are transmitted by the transmitter is unknown or can only be imprecisely determined, error is introduced to the range estimate which may lead to inaccuracy in object detection and tracking.

SUMMARY

In one aspect, a method of determining the location of a physical object using a passive radar receiver incudes determining if a transmitter beam sweeping period (TBSP) is known and executing a TBSP-based receiver beam sweeping if the TBSP is known. The method includes determining if the TBSP can be measured if the TBSP is not known. The method includes executing the TBSP-based beam sweeping if the TBSP can be measured. The method includes executing a random receiver beam sweeping if the TBSP is not known and cannot be measured. The method includes determining a relative time of arrival of radio signals between the LoS path and the target path, and determining the propagation time on the LoS path and on the target path. The method includes determining the location of the physical object using the propagation times.

In an additional aspect, the method includes sweeping receive beams of the passive radar receiver by controlling spatial directions and time intervals of the receive beams using the TBSP-based receiver beam sweeping. The method includes determining a time of arrival of the radio signals on the LoS path and the time of arrival on the target path. The method includes determining the relative time of arrival of the radio signals between the LoS path and the target path.

In an additional aspect, the method includes sweeping receive beams of the passive radar receiver by controlling spatial directions and time intervals of the receive beams using the random receiver beam sweeping. The method includes determining a time of arrival of the radio signals on the LoS path and the time of arrival on the target path. The method includes determining the relative time of arrival of the radio signals between the LoS path and the target path.

In an additional aspect, the TBSP-based receiver beam sweeping includes selecting LoS beam groups for respective minimum beam periods, measuring a synchronization coherence time at the receiver, and determining a receiver beam sweeping period based on the synchronization coherence time.

In an additional aspect, the method includes allocating a target beam group and a line of sight (LoS) beam group, wherein the target beam group is associated with a target path and the LoS beam group is associated with an LoS path.

In an additional aspect, the method includes dividing the receiver beam sweeping period into a plurality of receiver beam intervals, wherein the receiver beam intervals indicate time periods for receiver beam configuration, and associating one of the receiver beam intervals with one of the LoS beam groups.

In an additional aspect, the random receiver beam sweeping includes measuring signal strength of receive beams in one of more beam evaluation periods, selecting one of the receive beams and determining a synchronization coherence time of the receive beam, and determining the receiver beam sweeping period based on the synchronization coherence time.

In an additional aspect, a method of determining the location of a physical object using a passive radar receiver includes determining if a transmitter beam sweeping period (TBSP) is known, and executing a TBSP-based receiver beam sweeping if the TBSP is known. If the TBSP is not known, the method includes determining if the TBSP can be measured, and executing the TBSP-based beam receiver sweeping if the TBSP can be measured. The method includes executing a random receiver beam sweeping if the TBSP is not known and cannot be measured. The method includes determining a relative time of arrival of radio signals between the LoS path and the target path, and determining the propagation time on the LoS path and on the target path. The method includes determining the location of the physical object using the propagation times. The method includes sweeping receive beams of the passive radar receiver by controlling spatial directions and time intervals of the receive beams using the TBSP-based receiver beam sweeping. The method includes sweeping receive beams of the passive radar receiver by controlling spatial directions and time intervals of the receive beams using the random receiver beam sweeping.

In an additional aspect, a computer program product comprising a computer readable medium having computer program logic for controlling a passive radar receiver for determining the location of a physical object includes: program code to allocate a target beam group and a line of sight (LoS) beam group, wherein the target beam group is associated with a target path and the LoS beam group is associated with an LoS path; program code to determine if a transmitter beam sweeping period (TBSP) is known and to execute a TBSP-based receiver beam sweeping if the TBSP is known; program code to determine if the TBSP can be measured and to execute the TBSP-based beam sweeping if the TBSP can be measured; program code to execute a random receiver beam sweeping if the TBSP is not known and cannot be measured; program code to determine a relative time of arrival of radio signals between the LoS path and the target path and to determine propagation times on the LoS path and on the target path; and program code to determine the location of the physical object using the propagation times.

In an additional aspect, a method of determining the location of a physical object using a passive radar receiver includes determining a synchronization coherence time at the receiver. The method includes determining a receiver beam sweeping period (RBSP) using the synchronization coherence and a transmitter beam sweeping period (TBSP). The method includes controlling spatial directions and time interval of receiver beams based on the RBSP. The method includes determining a relative time of arrival of radio signals between an LoS path and a target path, and determining the propagation times on the LoS path and on the target path. The method includes determining the location of the physical object using the propagation times.

In an additional aspect, a method of determining the location of a physical object using a passive radar receiver includes determining a synchronization coherence time at the receiver. The method includes determining a receiver beam sweeping period (RBSP) using the synchronization coherence and a random receiver beam sweeping, and controlling spatial directions and time interval of receiver beams based on the RBSP. The method includes determining a relative time of arrival of radio signals between an LoS path and a target path, and determining the propagation times on the LoS path and on the target path. The method includes determining the location of the physical object using the propagation times.

BRIEF DESCRIPTION OF THE DRAWINGS

The same reference numbers or other reference designators are used in the drawings to designate the same of similar (functionally and/or structurally) features.

DETAILED DESCRIPTION

Figure 1:
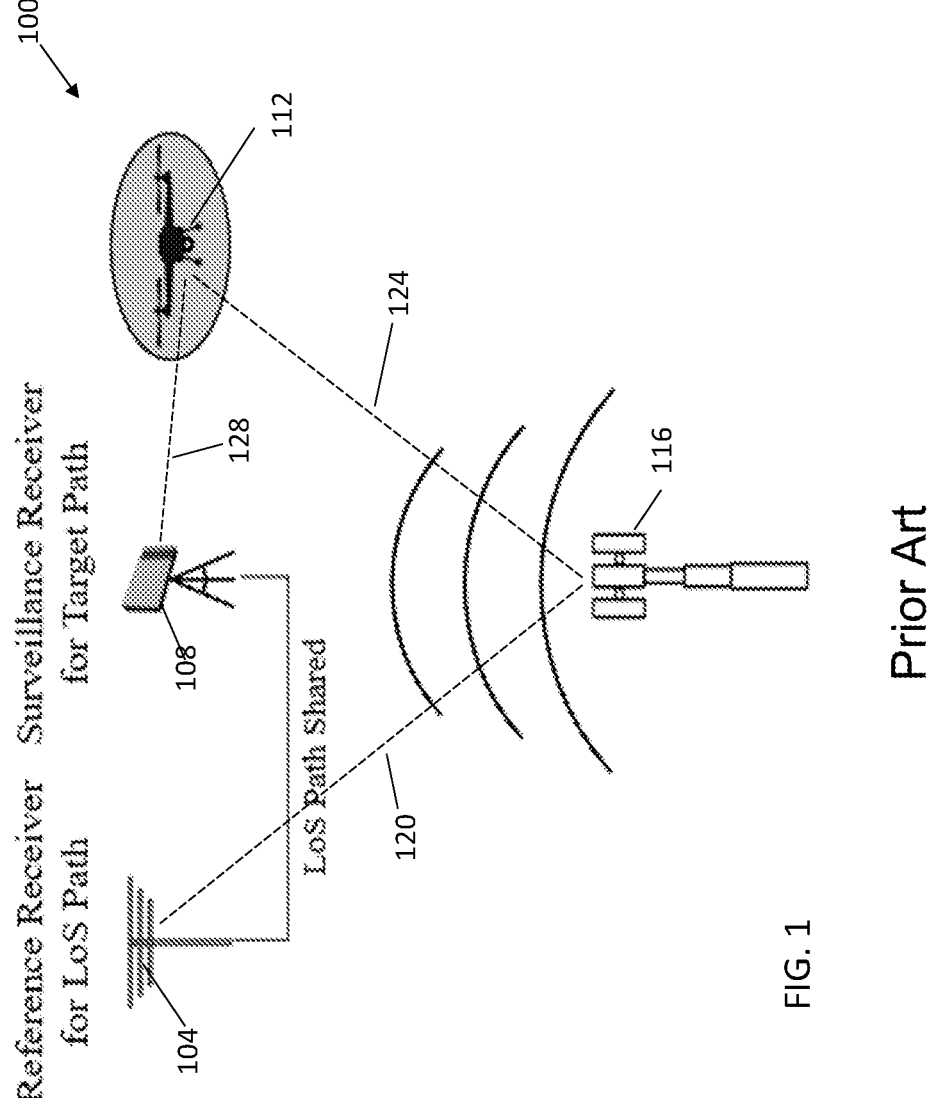
FIG. 1 illustrates a current system which may be used to detect a physical object.
Figure 2:
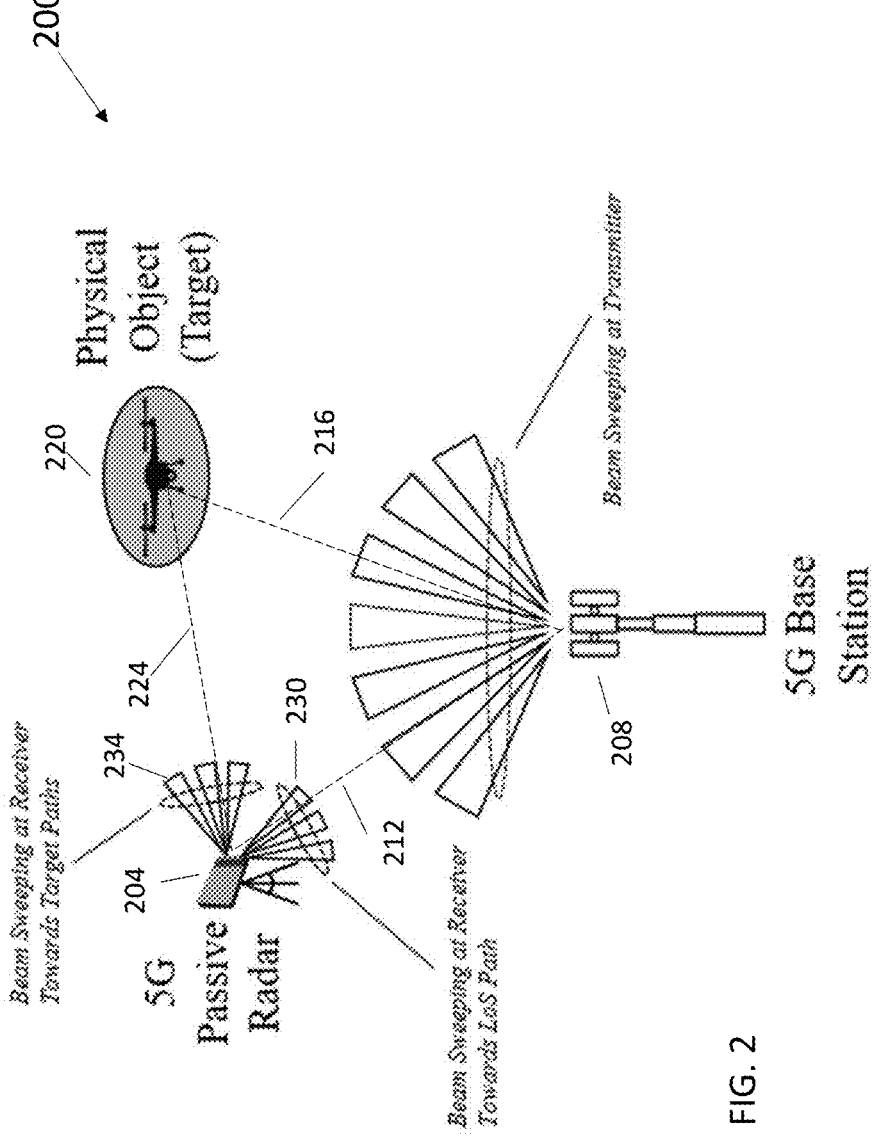
FIG. 2 illustrates a passive radar system of an example embodiment.

FIG. 2 illustrates a passive radar system 200 of an example embodiment. The system 200 includes a passive radar receiver 204 and a transmitter 208. The transmitter 208 may, for example, be a 5GNR base station. The transmitter 208 transmits radio signals which propagate on a line of sight (LoS) path 212 and are received by the receiver 204.

The radio signals transmitted by the transmitter 208 also propagates on a path 216 and arrives at a physical object 220. The physical object 220 may be a drone, an aircraft or any other physical object. Due to interaction with the physical object 220, the radio signals are reflected and/or scattered by the physical object 220, and the reflected and/or scattered signals propagate on a path 224 and are finally received by the receiver 204. The paths, 216 and 224, are together referred to as the target path. The total distance associated with the target path is the sum of the distance associated with the path 216 and the distance associated with the path 224.

In an example embodiment, a beam sweeping schedule is determined. A beam sweeping schedule for the receiver 204 refers to spatial directions and time intervals of receive beams during a receiver beam sweeping period (RBSP). A beam sweeping schedule for the transmitter refers to spatial directions and time intervals of transmit beams during a transmitter beam sweeping period (TBSP). A transmit beam indicates a spatial direction at which the transmitter 208 radiates energy, and a receive beam indicates a spatial direction at which the receiver 204 captures energy. The terms beam sweeping, beam steering and beam forming are used interchangeably herein.

Based on the receiver beam sweeping schedule, the receiver 204 steers multiple beams 230 at spatial directions generally towards the transmitter 208 and also steers multiple beams 234 at spatial directions generally towards the physical object 220 at fixed time intervals. The receiver beam sweeping schedule improves performance of the system 200 and may allow the system 200 to detect, locate and track the physical object 220 using a single receiver, (i.e., the receiver 204) instead of requiring two separate receivers.

In an example embodiment, the time of arrival of the radio signals propagating on the LoS path 212 and the time of arrival of the radio signals propagating on the target path (paths 216 and 224) are detected. Based on the time of arrival on the LoS path 212 and on the target path (paths 216 and 224), a relative time of arrival between the target path (paths 216 and 224) and the LoS path 212 is determined.

Because, the distance associated with the LoS path 212 is less than the distance associated with the target path which includes the paths 216 and 224, the radio signal propagating from the transmitter 208 on the target path (i.e., paths 216 and 224) arrives at a later time at the receiver 204 than the radio signal propagating from the transmitter 208 on the LoS path 212. The relative time of arrival is equal to the time delay associated with the arrival time of the radio signal on the target path (i.e., paths 216 and 224) compared to the arrival time of the radio signal on the LoS path 212.

Since the absolute time at which the radio signals are transmitted by the transmitter 208 is uncertain or may only be imprecisely determined which may lead to inaccuracy in the range estimate, the relative time of arrival between the LoS path 212 and on the target path (paths 216 and 224) is determined which is then used to determine the propagation time. The propagation time of the target path is used in range estimates to detect and locate the physical object 220.

In an example embodiment, the relative time of arrival is determined over multiple beams and the periodicity at which the radio signals are transmitted by the transmitter 208. The periodicity refers to the time intervals at which the transmitter 208 (e.g., 5G radio base station) radiates transmit beams. If the receiver 204 fails to receive the radio signals on the LoS path 212 in a particular beam, the receiver 204 can use the periodicity to receive radio signals in future beams and determine the relative time of arrival.

Figure 3:
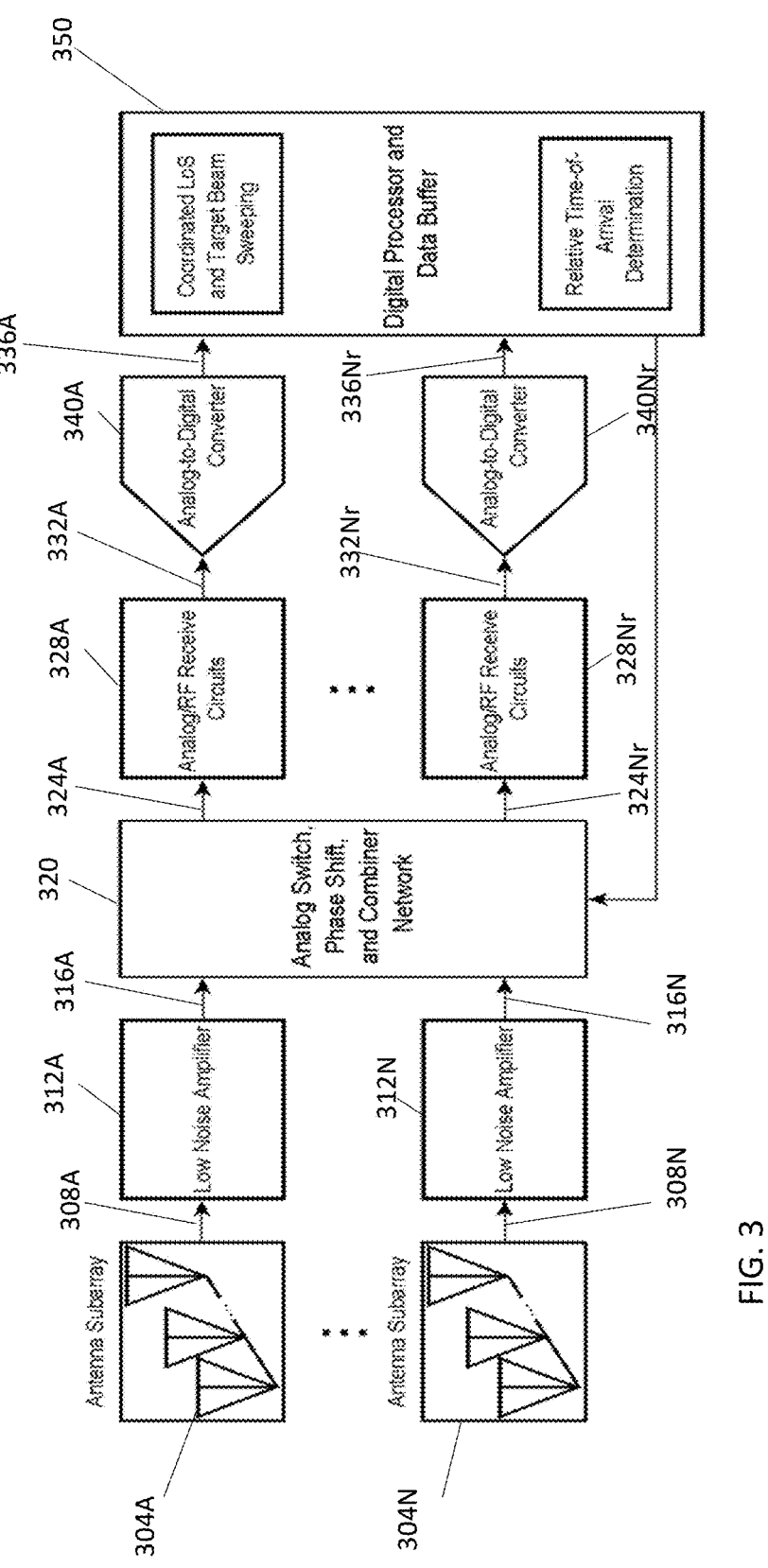
FIG. 3 illustrates various components of the passive radar receiver in accordance with an example embodiment.

FIG. 3 illustrates various components of the passive radar receiver 204 in accordance with an example embodiment. The passive radar receiver 204 is configured to determine the beam sweeping schedule of the receiver and based on the beam sweeping schedule of the receiver, the physical object is detected.

The receiver 204 includes antenna subarrays 304A-304N, each of which may include multiple antenna elements. The antenna subarrays 304A-304N may be implemented, for example, using printed circuit board (PCB) patch arrays, coaxially connected antennas or any other type of antennas. Radio signals transmitted by the transmitter 208 (e.g., 5GNR base station) are received by the subarrays 304A-304N on two paths: the LoS path 212; and the target path which includes paths 216 and 224. The feed from each subarray is sent to a low noise amplifier (LNA). For example, the feed

308A from the subarray 304A is sent to an LNA 312A, and the feed 308N from the subarray 304N is sent to an LNA 312N. The LNAs 312A-312N minimize noise impact of the receiver 204. The LNAs 312A-312N provide respective analog signals 316A-316N to an analog network 320. The analog network 320 may include analog switches to enable or disable connections. The analog network 320 may also include phase shifters to change the phase of different analog signal routes and may include combiners to group signal routes together. In some example embodiments, the analog network 320 may be implemented using PCB routing and integrated circuit (IC) technologies.

In response to the analog signals 316A-316N, the joint network 320 provides analog signals 324A-324Nr. In some example embodiments, N is equal to Nr but in other example embodiments, N is not equal to Nr. The analog signals 324A-324Nr are processed by RF receive circuits 328A-328Nr, respectively, which amplify, filter, and may apply frequency translation. In some example embodiments, the RF receive circuits 328A-328Nr can be implemented using IC technology.

The RF receive circuits 328A-328Nr provide respective outputs 332A-332Nr which are sampled and converted to digital signals 336A-336Nr by analog-to-digital converters (ADC) 340A-340Nr, respectively. In some example embodiments, each ADC may comprise multiple channels. For example each ADC may include two channels to generate in-phase (I) and quadrature (Q) signals for baseband processing.

In some example embodiments, one or more analog stages between the antenna subarrays 304A-304N and the ADCs 340A-340-Nr may be omitted or changed in order. For example, the LNAs 312A-312N may be omitted or they may be placed after the analog network 420.

In some example embodiments, multiple receivers such as the receiver 204, may be combined to form a system. Such as system, for example, may include two passive radar receivers where the two passive radar receivers which have different antenna configurations for different targets.

The digital signals 336A-336Nr are provided to a digital processor 350 which is configured to: (1) determine the relative time of arrival between the LoS path 212 and the target path (i.e., paths 216 and 224); and (2) determine the beam sweeping schedule. In some example embodiments, the digital processor 350 may be implemented in software, an application specific integrated circuit (ASIC), a general purpose processor, an FPGA, or a digital signal processor.

In some example embodiments, the receiver beam sweeping schedule is used to reconfigure the analog network 320 by, for example, toggling analog switches and by adjusting phase shift values.

In an example embodiment, the arrival times of the radio signals on the LoS path 212 and the target path (paths 216 and 224) are estimated. The arrival times can be estimated, for example, using standard radar processing such as found in pulse compression radar systems. For example, the arrival time can be estimated using a matched filter followed by a peak detection based on a predefined threshold. Next, the estimated time of arrival on the LoS and target paths are processed to produce a relative time of arrival estimate between the LoS path 212 and the target path (paths 216 and 224). Because the locations of the receiver 204 and the transmitter 208 are known, the time required for the radio signals to propagate on the LoS path 212 is also known as a consequence of the constant speed of electromagnetic waves. The relative time of arrival is measured and the propagation time on the target path can be determined.

Figure 4:
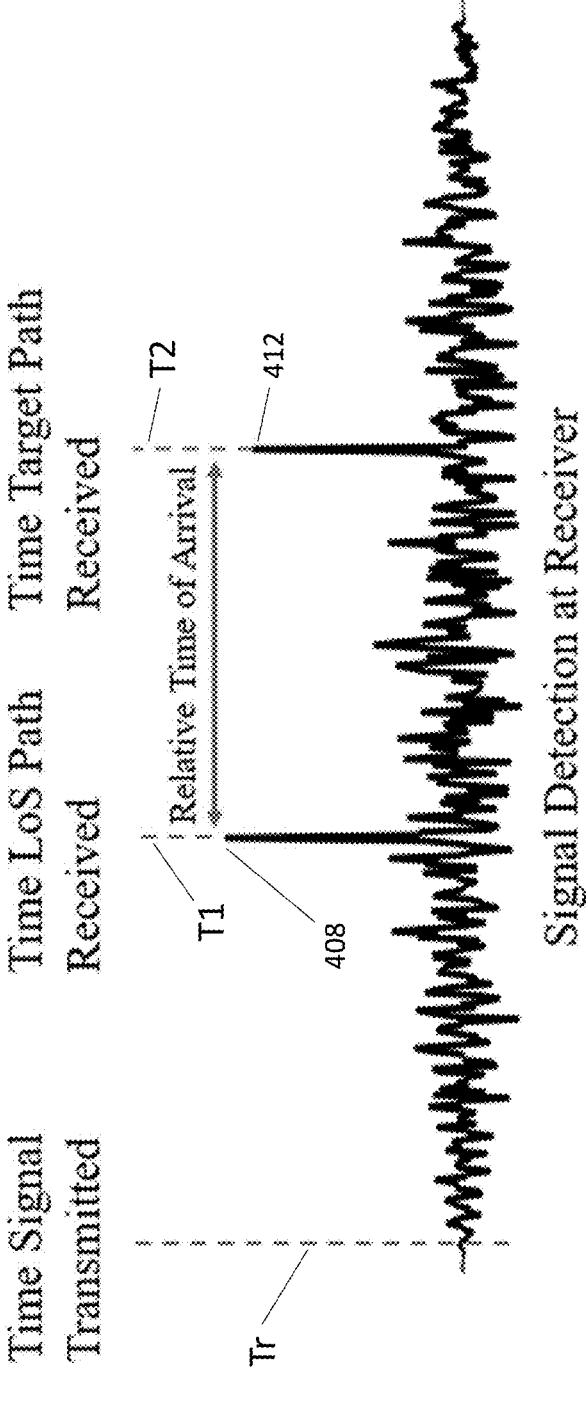
FIG. 4 illustrates an example signal used to estimate a relative time of arrival during a single transmit beam.

FIG. 4 illustrates an example signal used to estimate the relative time of arrival during a single transmit beam. In the example of FIG. 4, the distance associated with the LoS path 212 is known because the locations of the passive radar receiver 204 and the transmitter 208 are known. At time Tr, which may be unknown or can only be imprecisely determined, the transmitter 208 transmits radio signals. At time T1, the signal propagating the LoS path 212 is received by the receiver 204, which is indicated by a peak 408. At time T2, the signal propagating the target path (i.e., paths 216 and 224) is received by the receiver 204, which is indicated by a peak 412. As indicated by the two peaks 408 and 412, there is sufficient signal strength to determine the arrival times of the signals on both the LoS path 212 and the target path, thus allowing the detection and tracking of the physical object 220 during a single transmit beam.

Because the distance associated with the LoS path 212 is less than the distance associated with the target path which includes paths 216 and 224, the radio signal propagating from the transmitter 208 on the target path (i.e., paths 216 and 224) is received at a later time by the receiver 204 than the radio signal propagating from the transmitter 208 on the LoS path 212 which is received by the receiver 204. The relative time of arrival between the target path (i.e., arrival time of signal propagating on the target path) and the LoS path (i.e., arrival time of signal propagating on the LoS path) is equal to the time delay (T2–T1).

Figure 5:
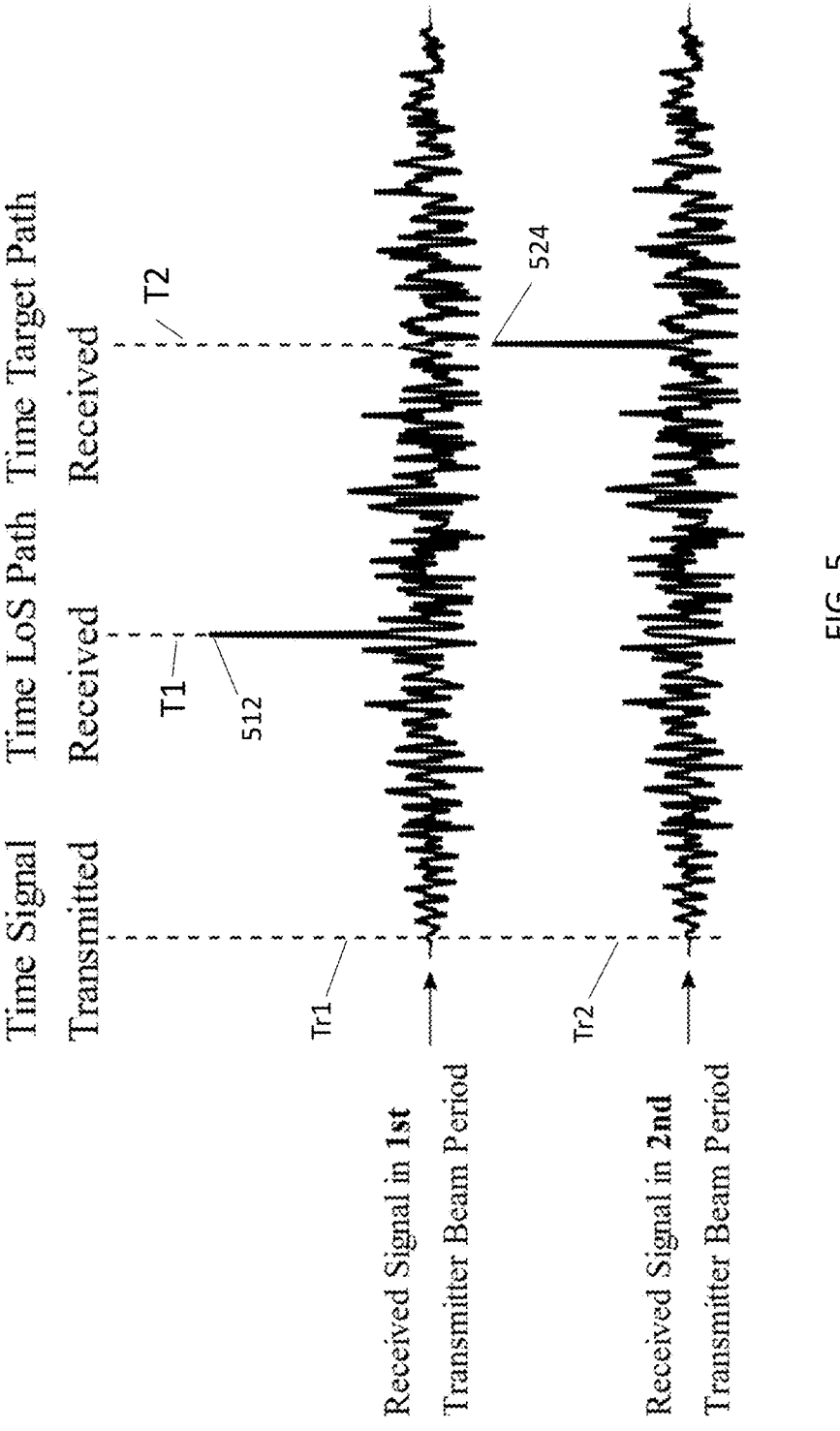
FIG. 5 illustrates example signals used to estimate a relative time of arrival when two transmit beams are required to determine the relative time of arrival.

FIG. 5 illustrates example signals used to estimate the relative time of arrival when two transmit beams are required to determine the relative time of arrival. In the example of FIG. 5, at time Tr1, in a first transmit beam, the transmitter 208 transmits radio signals which propagate over the LoS path 212 and is received by the receiver 204 at time T1, which is indicated by a peak 512. There is sufficient strength in the signal propagating over the LoS path 212 to determine the arrival time on the LoS path 212 but insufficient signal strength to determine the target path (i.e., paths 216 and 224).

At time Tr2 which may not be known absolutely but only because it has a known delay from Tr1, the transmitter 208 transmits radio signals in a second transmit beam which propagate over the LoS path 212. There is insufficient strength to determine the arrival time of the signal propagating over the LoS path. The transmitted signals also propagate over the target path (i.e., paths 216 and 224) and is received by the receiver 204 at time T2, which is indicated by a peak 524. There is sufficient strength in the signal propagating over the target path to determine arrival time. Assuming the interval between the first and the second transmit beams is known or can be measured by, for example, downlink broadcast channel beam periods in a 5GNR transmitter, multiple transmit beams can be combined to measure the relative time of arrival.

Based on the receiver beam sweeping schedule, the receiver 204 steers multiple beams 230 at spatial directions generally towards the transmitter 208 and also steers multiple beams 234 at spatial directions generally towards the physical object 220 at fixed time intervals. The beam sweeping schedule improves the system 200 by allowing the system 200 to detect and track the physical object 220 using a single receiver, (i.e., the receiver 204) instead of requiring two separate receivers.

Figure 6:
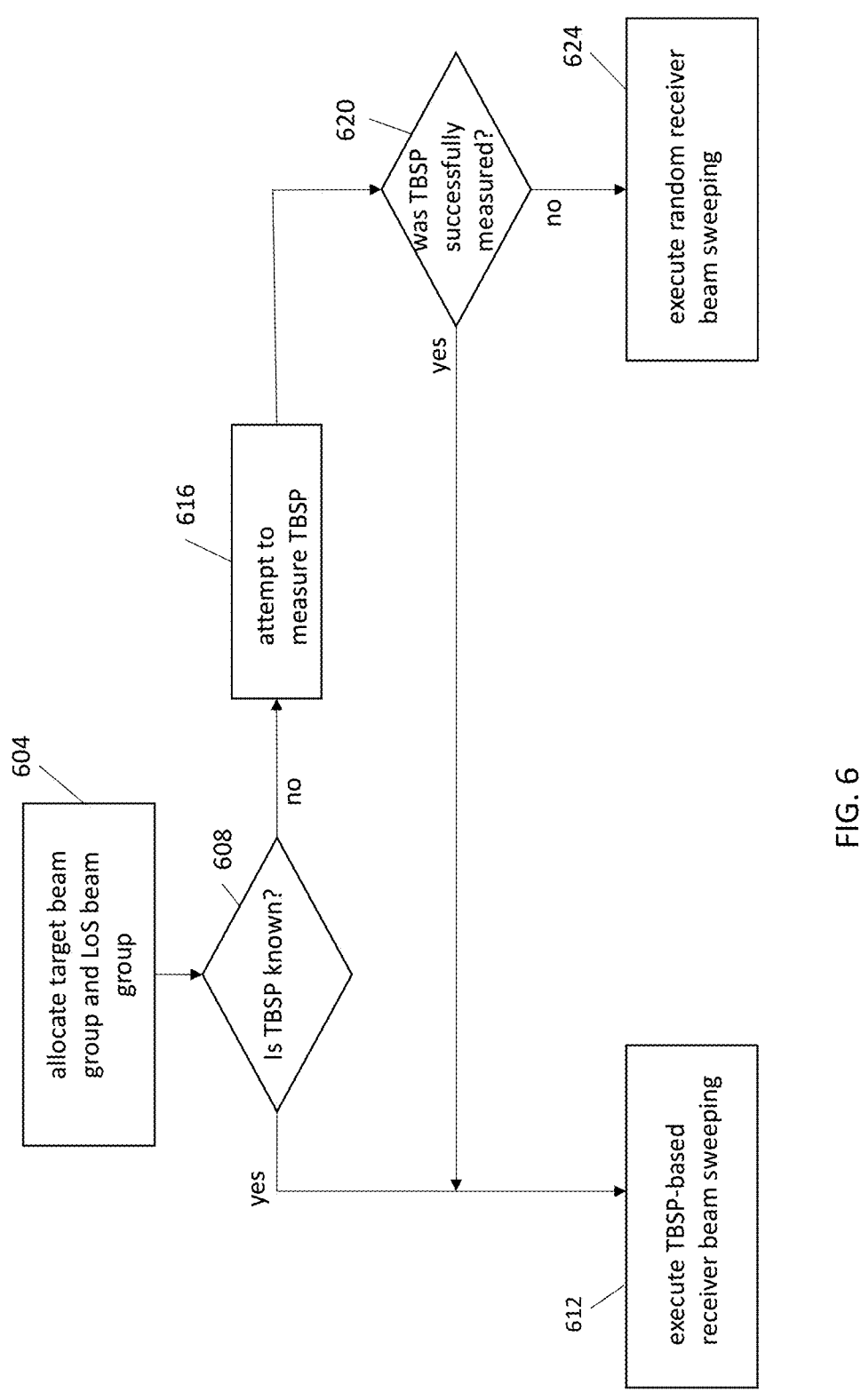
FIG. 6 is a flow diagram of a method for determining a receiver beam sweeping schedule in accordance with an example embodiment.

FIG. 6 is a flow diagram of a method for determining a receiver beam sweeping schedule in accordance with an example embodiment. In block 604, two groups of receive beam configurations are allocated. The first group of beam configurations, referred to as the target beam group, are associated with the target path (paths 216 and 224), and the second group of beam configurations, referred to as the LoS beam group, are associated with the LoS path 212. For example, the target beam group may include a beam pointed at –30 degree azimuth angle, another beam pointed at 0 degree azimuth angle, and another beam pointed at +30 degree azimuth angle. The LoS beam group may include a beam pointed at –135 degree azimuth and another beam pointed at +135 degree azimuth.

In decision block 608, a decision is made if a transmitter beam sweeping period (TBSP) is known. If the transmitter is standardized, the TBSP may be known beforehand. For example, a 5GNR base station repeats the same beam schedule for the downlink broadcast channel every 20 milliseconds, and so the TBSP is 20 milliseconds. If the TBSP is known, the flow moves to block 612 where a TBSP-based receive beam sweeping is executed.

If TBSP is not known, then in block 616 an attempt is made to measure the TBSP. The TBSP can be measured, for example, by choosing a receive beam at the receiver 204 and measuring the received signal strength over a predetermined period of time (e.g., 1 second). TBSP measurement will generally be successful if there are consistent short term measurement intervals with the same received power associated with a minimum beam period (MBP) and consistent long term measurement intervals that contain the same short-term measurement patterns associated with the TBSP. For example, a consistent short term interval may be characterized by a fixed receive beam with a received power of –60 dBm+/–10 dBm for 18 contiguous microseconds. If this is the smallest contiguous consistent power interval during measurement period, it becomes the minimum beam period (MBP). In 5GNR transmitted signals with a 240 kHz subcarrier spacing, the MBP is 18 microseconds. In 5GNR there may be up to 64 MBPs associated with different power levels within the TBSP of 20 msec. This can be measured by observing the pattern of MBPs and their received power and then calculating the minimum time for the MBP power pattern to repeat.

In decision block 620, a decision is made if the TBSP was successfully measured. If the TBSP was successfully measured, the flow proceeds to block 612 where the TBSP-based receive beam sweeping is executed. If the TBSP cannot be measured, the flow proceeds to block 624 where a random receive beam sweeping is executed. The TBSP-based receive beam sweeping and the random receive beam sweeping are described below.

Figure 7:
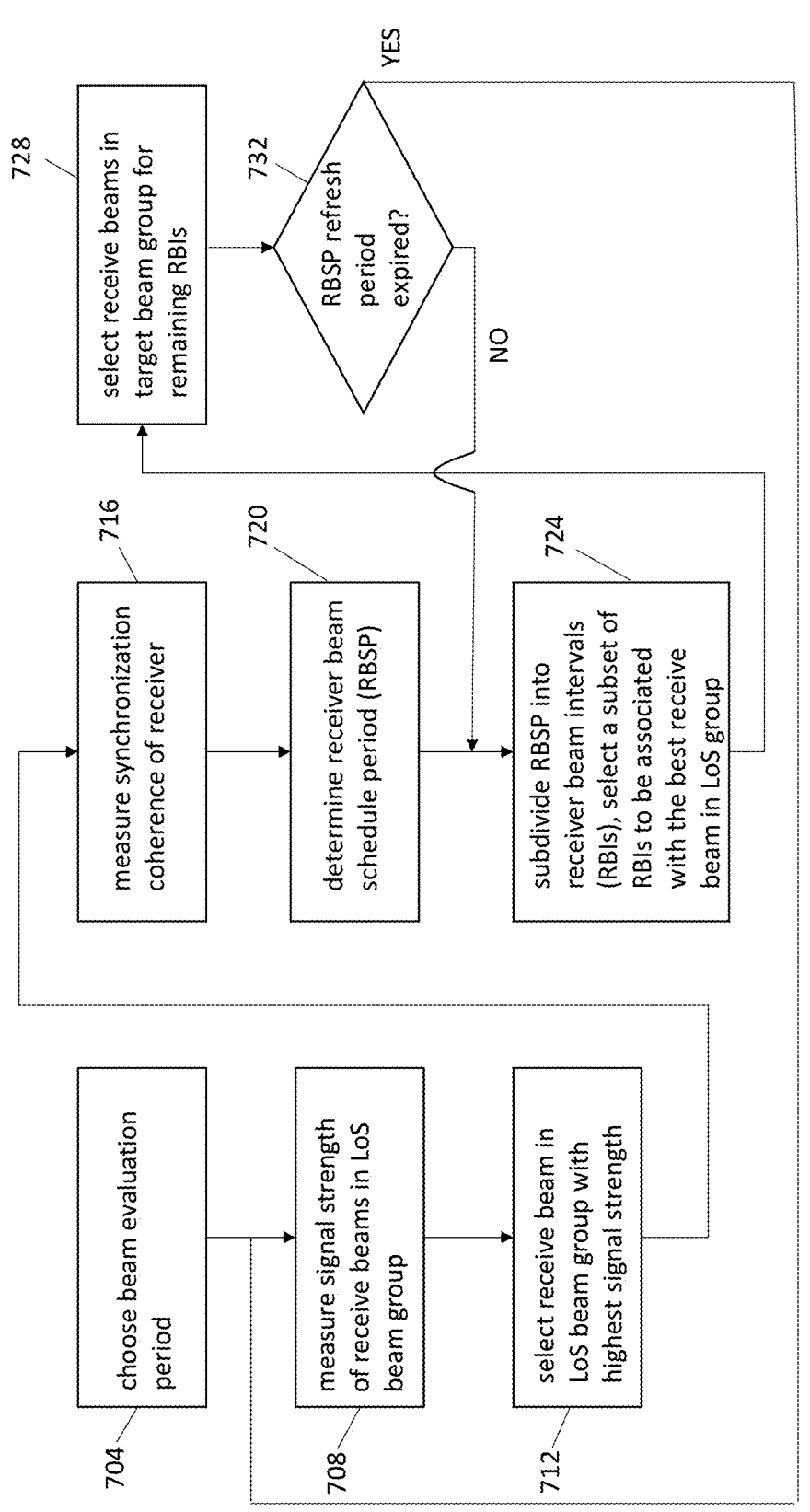
FIG. 7 is a flow diagram of a method for a TBSP-based receive beam sweeping in accordance with an example embodiment.

FIG. 7 is a flow diagram of a method for the TBSP-based receive beam sweeping in accordance with an example embodiment. In block 704, a beam evaluation period (BEP) is chosen. The BEP is chosen so that each receive beam has a sufficient length of time to allow measurement of the signal strength across transmit beams within the TBSP. If the TBSP is known, the BEP can be set equal to the TBSP. In a 5GNR system, the TBSP is typically 20 milliseconds, and thus the BEP can be set equal to 20 milliseconds.

In block 708, the signal strength of each received beam in the LoS beam group is measured for an entire BEP (multiple BEPs will be required for multiple beams). In block 712, based on the received signal strength for each receive beam, the best LoS beam (e.g., LoS beam having the highest signal strength) for each MBP within the TBSP is selected. For example, for each of the 64 MBPs in a 5GNR broadcast downlink transmission, a receive beam within the LoS beam group with highest signal strength is selected.

In block 716, a synchronization coherence time at the receiver 204 is measured. The synchronization coherence time measurement is used to determine any mismatch between frequency references (e.g., mismatch of clocks that provide timing for analog-to-digital converter samples at the receiver 204 and clocks that provide timing for digital-to-analog converter signals at the transmitter 208) or any movement in the transmitter 208 or the receiver 204 location, both of which lead to time shifts in the relative time of arrival estimate. In some example embodiments, the synchronization coherence time is determined by repeatedly computing the LoS time of arrival within the TBSP and detecting the mean time it takes the LoS time of arrival estimate to shift by one sample within the TBSP (e.g., 10 nanoseconds in a 5GNR system).

After the synchronization coherence time is measured, the receiver beam sweeping period (RBSP) is computed as, for example, 25% of the synchronization coherence time. The RBSP allows the system to determine how frequently receive beams in the LoS need to be allocated within the RBSP so accurate relative time of arrival estimates between the LoS path and the target path are maintained. For example, if it requires 4 seconds for the LoS sample arrival time to drift by one sample, the RBSP may be set to 1 second, which is 50 repetitions of the 20 millisecond 5GNR TBSP.

In block 724, each RBSP is subdivided into receiver beam intervals (RBIs) which are intervals of time for a fixed received beam configuration. Generally, RBIs are used to match receive beams with transmit beams to estimate the LoS and target paths. Since a transmit beam is consistent in an MBP, RBIs often equal MBPs. For example, an RBI can be 18 microseconds, which is the duration of a broadcast channel beam in a 5GNR transmission with a 240 kHz subcarrier spacing.

In block 724 after RBIs are allocated within each RBSP, a subset of the RBIs are first allocated to track the LoS path. Generally these RBIs are selected to have highest received signal strength on the LoS path. For example, in 5GNR with a 20 millisecond TBSP and a 1 second RBSP, there are 64 total RBIs within each TBSP and 3200 total RBIs within each RBSP. In this example, a single beam in the LoS group and the RBI with strongest received power in the first 20 milliseconds of the RBSP are selected so that only 1 out of 3200 beams in each RBSP use receive beams in the LoS group (3199 RBIs in the RBSP are allocated receive beams in the target group).

In block 728 the remaining RBIs are assigned receive beams in the target beam group. For example, if 3199 RBIs in the RBSP are assigned received beams in the target beam group and there are 3 receive beams in the target beam group, using a round robin assignment 1067 RBIs will use the first receive beam in the target beam group, 1066 RBIs will use the second receive beam in the target beam group, and 1066 RBIs will use the third receive beam in the target beam group.

In some example embodiments, an RBSP refresh period (e.g., every 24 hours) is set and in decision block 732, a decision is made if the RBSP refresh period has expired. For example, a radio base station may be reconfigured, requiring a refresh of the RBSP.

If the RBSP refresh period has not expired, the flow returns to block 724 and for the remainder of the RBIs, RBSPs are assigned in this manner until the RBSP refresh time expires. After the RBSP refresh period has expired, the flow returns to block 708, where the LoS group receive beams are measured again.

Figure 8:
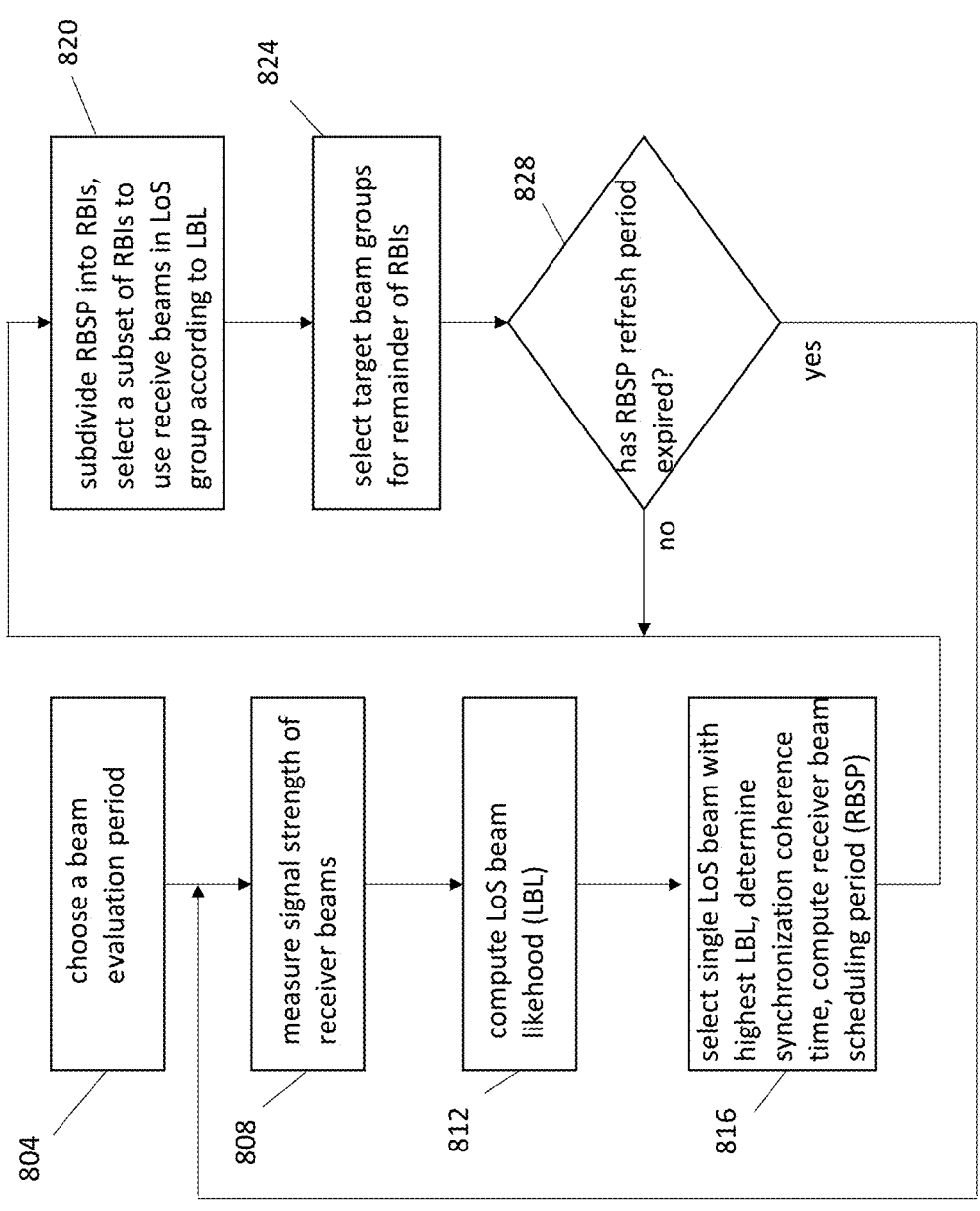
FIG. 8 is a flow diagram of a method for a random receiver beam sweeping when the TBSP is unknown or cannot be determined.

FIG. 8 is a flow diagram of a method for random receiver beam sweeping. In an example embodiment, the random receiver beam sweeping is used when the TBSP is unknown or cannot be determined. In block 804 a beam evaluation period (BEP) is chosen. Because the TBSP is unknown, the BEP is chosen so that each receive beam has a sufficient length of time to determine the signal strength across the transmitter beams within the TBSP. If the minimum beam period (MBP) has been determined earlier, the BEP should occupy many MBPs (for example 1000 MBPs). If the MBP has not been determined earlier, the BEP is set according to reasonable time intervals. For example a BEP of 1 sec is often sufficient in modern communication systems to sweep through every transmit beam.

In block 808, the signal strength of the receive beams are measured. In some example embodiments, the signal strengths of all receive beams in both the LoS beam groups and target beam groups over multiple BEPs are measured.

In block 812, the LoS beam likelihood (LBL) is computed. In an example embodiment, LBLs of each LoS beam group are set equal to the mean power measured by the single LoS beam group over the BEP divided by the mean power measured by all of the LoS group beams totaled over all the BEPs. For example, there may be two receive beams in the LoS beam group, and beam #1 in this group has a measured mean power of 0.1 over the BEP and beam #2 in this group has a measured mean power of 0.2 over the BEP. Therefore, the LBL of beam #1 is $0.1/(0.1+0.2)=\frac{1}{3}$ and the LBL of beam #2 is $0.2/(0.1+0.2)=\frac{2}{3}$. Thus, beam #1 is selected $\frac{1}{3}$ of the time when an LoS beam is allocated within the RBSP and beam #2 is selected $\frac{2}{3}$ of the time when an LoS beam is allocated within the RBSP.

In block 816, a single receive beam from the LoS beam group is selected (e.g., receive beam with highest LBL), and the synchronization coherence time is determined. In some example embodiments, the synchronization coherence time is determined by repeatedly computing the LoS time of arrival within the TBSP and detecting the mean time it takes the LoS time of arrival estimate to shift by one sample within the TBSP (e.g., 10 nanoseconds in a 5GNR system). After the synchronization coherence time is determined, the receiver beam sweeping period (RBSP) is computed such as, for example, 25% of the synchronization coherence time. Each RBSP is subdivided into receiver beam intervals (RBIs) which are intervals of time for fixed receiver beam configuration. The RBIs may be set to the MBPs, if known, or determined earlier. If the MBPs are not known, typical values are used, for example 18 microseconds in 5GNR with 240 kHz subcarrier spacing In block 820, within each RBSP a subset of the RBIs are selected and associated with an LoS beam group according to its LBL. For example, if a single RBI is allocated to each RBSP for receive beams in LoS group, and there are two LoS beams with LBL of $\frac{1}{3}$ and $\frac{2}{3}$, respectively, the RBSP will use LoS beam #1 with probability $\frac{1}{3}$ and LoS beam #2 with probability $\frac{2}{3}$, respectively.

In block 824, for the remainder of the RBIs in the RBSP, target beam groups are selected. For example, if there are 1000 RBIs in the RBSP, 2 receive beams are allocated from the LoS beam group, 998 RBIs in the RBSP are assigned received beams in the target beam group, and there are 2 total receive beams in the target beam group, which results in 499 RBIs assigned to each receive beam in the target beam group using a round robin assignment.

In some example embodiments, an RBSP refresh period is set, and in decision block 828, a decision is made on if the RBSP refresh period has expired. If the RBSP refresh period has not expired, the flow returns to block 820 where RBSPs continued to be assigned in this manner until the RBSP refresh time expires. If the RBSP refresh time has expired, the flow returns to block 808.

Based on the RBSP, the beam sweeping schedule for the receiver 204 is determined. As discussed before the beam sweeping schedule for the receiver 204 indicates spatial directions and time intervals of receive beams during a receiver beam sweeping period (RBSP). Based on the receiver beam sweeping schedule, the receiver 204 steers multiple beams 230 at spatial directions generally towards the transmitter 208 and also steers multiple beams 234 at spatial directions generally towards the physical object 220 at fixed time intervals. The beam sweeping schedule allows the receiver 204 to be steered in directions that enable frequent detection of the time of arrival on the LoS path 212 and the time of arrival on the target path (paths 216 and 224). The time of arrival of the LoS path 212 and the target path (paths 216 and 225) are used to compute the relative time of arrival between the LoS path 212 and the target path (paths 216 and 224). The relative time of arrival is then used to estimate the propagation time which is used to determine target path distance of the physical object 220.

In accordance with the disclosed embodiments, the synchronization coherence time is determined which is used to determine the RBSP. The RBSP is used to accurately estimate the relative time of arrival.

The methods and systems described herein can be used for geolocation of targets using conventional bistatic radar processing including angle of arrival estimation at the radar receiver, target triangulation based on the location of the transmitter 208 and the receiver 204, target tracking based on the geolocation of the target over time, target classification based on the target tracks (e.g., how fast the targets move), and visualization of the target and its track on a display (e.g., a monitor).

In some example embodiments, a computer program product includes a computer readable medium having computer program logic for controlling a passive radar receiver for determining the location of a physical object. The computer program logic includes program code to determine if a transmitter beam sweeping period (TBSP) is known and to execute a TBSP-based receiver beam sweeping if the TBSP is known. The computer program logic includes program code to determine if the TBSP can be measured and to execute the TBSP-based beam sweeping if the TBSP can be measured. The computer program logic includes program code to execute a random receiver beam sweeping if the TBSP is not known and cannot be measured. The computer program logic includes program code to determine a relative time of arrival of radio signals between the LoS path and the target path and to determine the propagation time on the LoS path and on the target path. The computer program logic includes program code to determine the location of the physical object using the propagation time.

The disclosed embodiments can be adapted and used in various applications such as, for example, Doppler processing, Doppler filtering, multiple-input multiple-output (MIMO) radar, multi-pulse moving target detection, constant false alarm rate (CFAR) processing, compressed sensing, and super-resolution radar since these techniques are directly added on top of the existing system.

Figure 9:
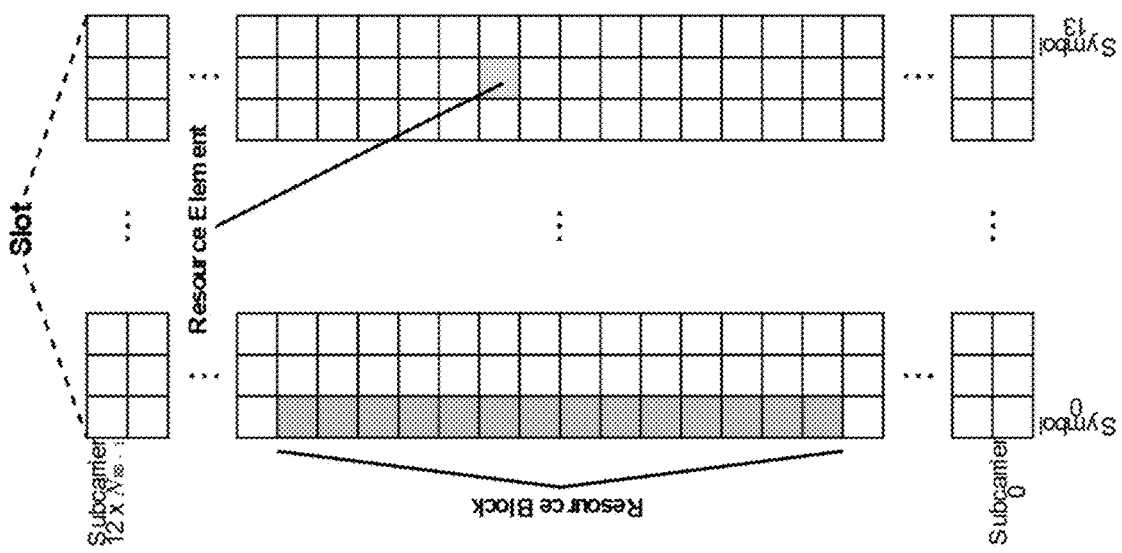
FIG. 9 illustrates a time-frequency grid where the indivisible units of time are OFDMA symbols and the indivisible units of frequency are subcarriers.

The disclosed embodiments are applicable to the 5G new radio (5GNR) standard, as provided by 3GPP with Release 15+. 5GNR signals are based on orthogonal frequency division multiplexing (OFDM) with multiple access (OFDMA). OFDMA allows the downlink signal bandwidth to be divided and spread across multiple users concurrently, where each user has its own user equipment (UE) to receive said downlink signals. This is accomplished through the construction of a time-frequency grid, as illustrated in FIG. 9, where the indivisible units of time are OFDMA symbols and the indivisible units of frequency are subcarriers.

In some example embodiments, a Physical Broadcast Channel (PBCH) can be transmitted based on the beam sweeping schedule described herein. During a network discovery process by UEs (cell search) base stations are unaware of UEs that have yet to connect to the network. Hence, base stations cannot efficiently steer to unconnected UEs and PBCH beams must be steered sequentially over all candidate beam directions.

Figure 10:
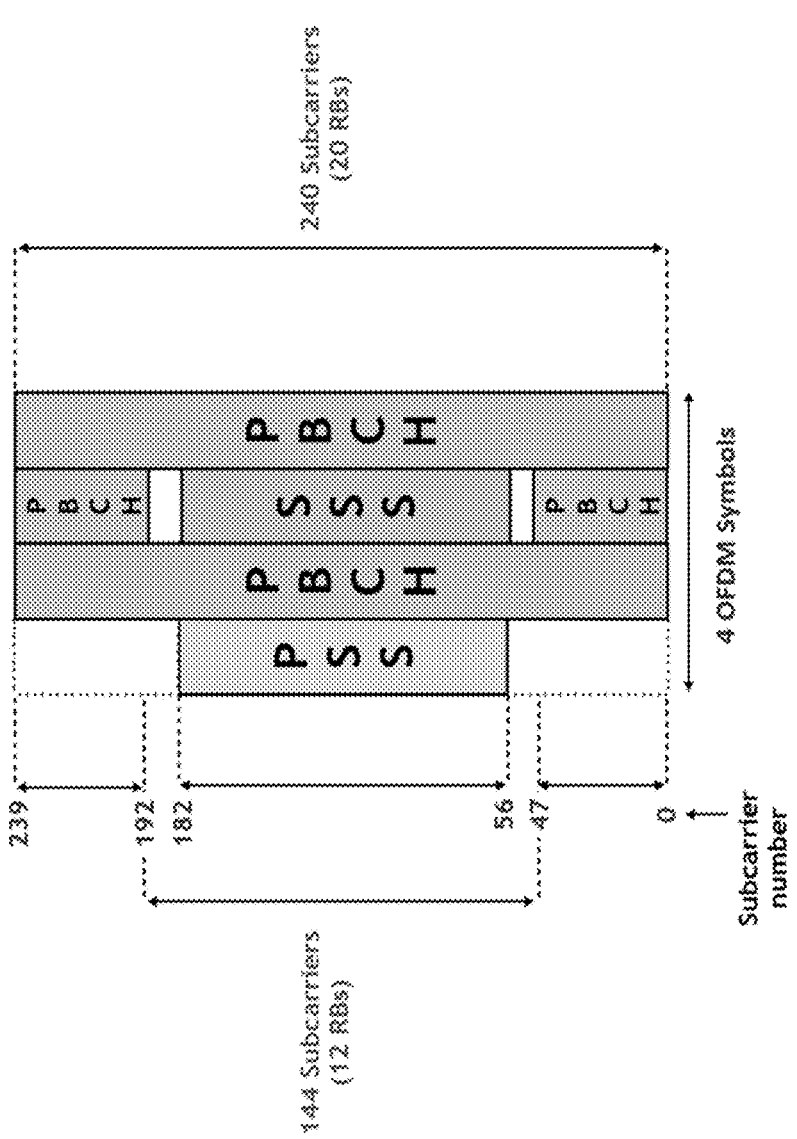
FIG. 10 illustrates an SSB unit is composed of four consecutive OFDM symbols.

From the PBCH perspective, a single beam operates on a Synchronization Signal/PBCH block (SSB) unit. The SSB unit is composed of four consecutive OFDM symbols and is entirely contained within 240 subcarriers (20 RBs), as illustrated in FIG. 10. The SSB block itself is transmitted in bursts of different beam configurations to accomplish beam sweeping. There are five notable characteristics of the SSB burst: (1) Bursts are periodically sent with different configurable periodicities: 5 msec, 10 msec, 20 msec, 40 msec, 80 msec, and 160 msec. (2) One SSB burst is entirely contained within a half frame (5 msec) and is configured to either be in the first half or second half frame. (3) Within a burst there are a configurable number of beams up to a maximum depending on the carrier frequency. (4) The beam is only characterized by the SSB index (all SSB blocks with that index have the same beam configuration) and physical beam directions are not reported. (5) The SSBs are transmitted at fixed time intervals that are defined by the standard.

The disclosed embodiments may be configured to conform to the 5GNR standard. The relative time of arrival may be continuously computed by continuously cross-correlating with the known PBCH symbol sequence in the passive radar receiver and TBSP-based receive beamforming schedules can be created where the TBSP is equal to the SSB burst period, the BEP is equal to the TBSP, and both the MBP and RBI equal the duration of 4 PBCH OFDM symbols.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A method of determining the location of a physical object using a passive radar receiver, comprising:

determining if a transmitter beam sweeping period (TBSP) is known;

executing a TBSP-based receiver beam sweeping if the TBSP is known;

if the TBSP is not known, determining if the TBSP can be measured;

executing the TBSP-based beam sweeping if the TBSP can be measured;

executing a random receiver beam sweeping if the TBSP is not known and cannot be measured;

determining a relative time of arrival of radio signals between a line of sight (Los) path and a target path, and determining a propagation time on the LoS path and on the target path; and determining the location of the physical object using the propagation times, wherein the TBSP-based receiver beam sweeping comprises:

selecting LoS beam groups for respective minimum beam periods;

measuring a synchronization coherence time at the receiver; and determining a receiver beam sweeping period based on the synchronization coherence time.

2. The method of claim 1, further comprising:

determining a time of arrival of the radio signals on the LoS path and the time of arrival on the target path.

3. The method of claim 1, wherein the LoS beam groups are selected based on the signal strength of received signals.

4. The method of claim 1, further comprising:

dividing the receiver beam sweeping period into a plurality of receiver beam intervals, wherein the receiver beam intervals indicate time periods for receiver beam configuration; and associating one of the receiver beam intervals with one of the LoS beam groups.

5. The method of claim 1, wherein the random receiver beam sweeping comprises:

measuring signal strength of receive beams in one of more beam evaluation periods;

selecting one of the receive beams and determining a synchronization coherence time of the receive beam; and determining the receiver beam sweeping period based on the synchronization coherence time.

6. A computer program product comprising a non-transitory computer readable medium having computer program logic for controlling a passive radar receiver for determining the location of a physical object, the computer program logic comprising:

program code to allocate a target beam group and a line of sight (LoS) beam group, wherein the target beam group is associated with a target path and the LoS beam group is associated with an LoS path;

program code to determine if a transmitter beam sweeping period (TBSP) is known and to execute a TBSP-based receiver beam sweeping if the TBSP is known;

program code to determine if the TBSP can be measured and to execute the TBSP-based beam sweeping if the TBSP can be measured;

program code to execute a random receiver beam sweeping if the TBSP is not known and cannot be measured;

program code to determine a relative time of arrival of radio signals between the LoS path and the target path and to determine a propagation time on the LoS path and on the target path; and program code to determine the location of the physical object using the propagation times.

* * * * *